United States Patent [19]

Lee et al.

[11] Patent Number: 5,611,017
[45] Date of Patent: Mar. 11, 1997

[54] FIBER OPTIC RIBBON CABLE WITH PRE-INSTALLED LOCATIONS FOR SUBSEQUENT CONNECTORIZATION

[75] Inventors: Nicholas A. Lee; Barbara A. DeBaun, both of Woodbury; Gordon D. Henson, Lake Elmo; Scott A. Igl, St. Paul; Terry L. Smith, Roseville, all of Minn.

[73] Assignee: Minnesota Mining and Manufacturing Co., St. Paul, Minn.

[21] Appl. No.: 544,611

[22] Filed: Oct. 18, 1995

Related U.S. Application Data

[63] Continuation-in-part of Ser. No. 456,571, Jun. 1, 1995, Pat. No. 5,574,817.

[51] Int. Cl.$^6$ ................................................. G02B 6/44
[52] U.S. Cl. ........................... 385/114; 156/179; 385/53
[58] Field of Search ................................ 385/53–56, 59, 385/65, 76–78, 83, 100, 114; 156/176, 178, 179

[56] References Cited

U.S. PATENT DOCUMENTS

| | | | |
|---|---|---|---|
| 3,864,018 | 2/1975 | Miller | 385/98 |
| 3,871,935 | 3/1975 | Gloge et al. | 156/158 |
| 3,920,432 | 11/1975 | Smith | 65/408 |
| 4,023,887 | 5/1977 | Speers | 385/114 X |
| 4,046,298 | 9/1977 | Schroeder, Jr. | 225/2 |
| 4,138,193 | 2/1979 | Olszewski et al. | 385/114 |
| 4,289,558 | 9/1981 | Eichenbaum et al. | 156/179 |
| 4,355,865 | 10/1982 | Conrad et al. | 385/114 |
| 4,468,089 | 8/1984 | Brorein | 385/114 |
| 4,496,215 | 1/1985 | Shaheen et al. | 385/114 |
| 4,715,677 | 12/1987 | Saito et al. | 385/114 |
| 4,793,683 | 12/1988 | Cannon, Jr. et al. | 385/60 |
| 4,980,007 | 12/1990 | Ferguson | 156/179 |
| 5,208,889 | 5/1993 | Cedrone et al. | 385/114 |
| 5,259,050 | 11/1993 | Yamakawa et al. | 385/59 |
| 5,309,537 | 5/1994 | Chun et al. | 385/59 |

FOREIGN PATENT DOCUMENTS

| | | |
|---|---|---|
| 0613031A1 | 8/1994 | European Pat. Off. . |
| 63-56609 | 3/1988 | Japan ........................ 385/114 |
| 7301715 | 11/1995 | Japan . |

OTHER PUBLICATIONS

Alcoa Fujikura Ltd. Technical Brochure, Feb. 1995, 1 page.
AT&T Multifiber Optical Cable Assemblies Product Catalog, Sep. 1993, 7 pages.
MACII™ Connector Family Technical Overview, pp. 83–88 [No Date].

*Primary Examiner*—John D. Lee
*Attorney, Agent, or Firm*—Gary L. Griswold; Walter N. Kirn; H. Sanders Gwin, Jr.

[57] ABSTRACT

A fiber optic ribbon cable has release elements manufactured in line with the ribbon cable so as to provide access points to the optical fibers contained therein to allow for easy application of a connector in the field. A pair of adhesive tape layers is provided about the optical fibers to create a fiber optic ribbon cable. At least one release element is provided between the adhesive tape layers and the optical fibers at one or more access points along the ribbon cable to allow for subsequent connectorization of the fibers therein. When the ribbon cable needs to be equipped with a connector, the cable is cut near the midpoint of one of the access point. After the cable is cut the adhesive tape layers and the at least one release element may be easily peeled back exposing the optical fibers. A connector is then installed onto the exposed fibers. The at least one release element is removed from the tape layers and the tape is then secured to the connector with any excess tape being trimmed off.

34 Claims, 14 Drawing Sheets

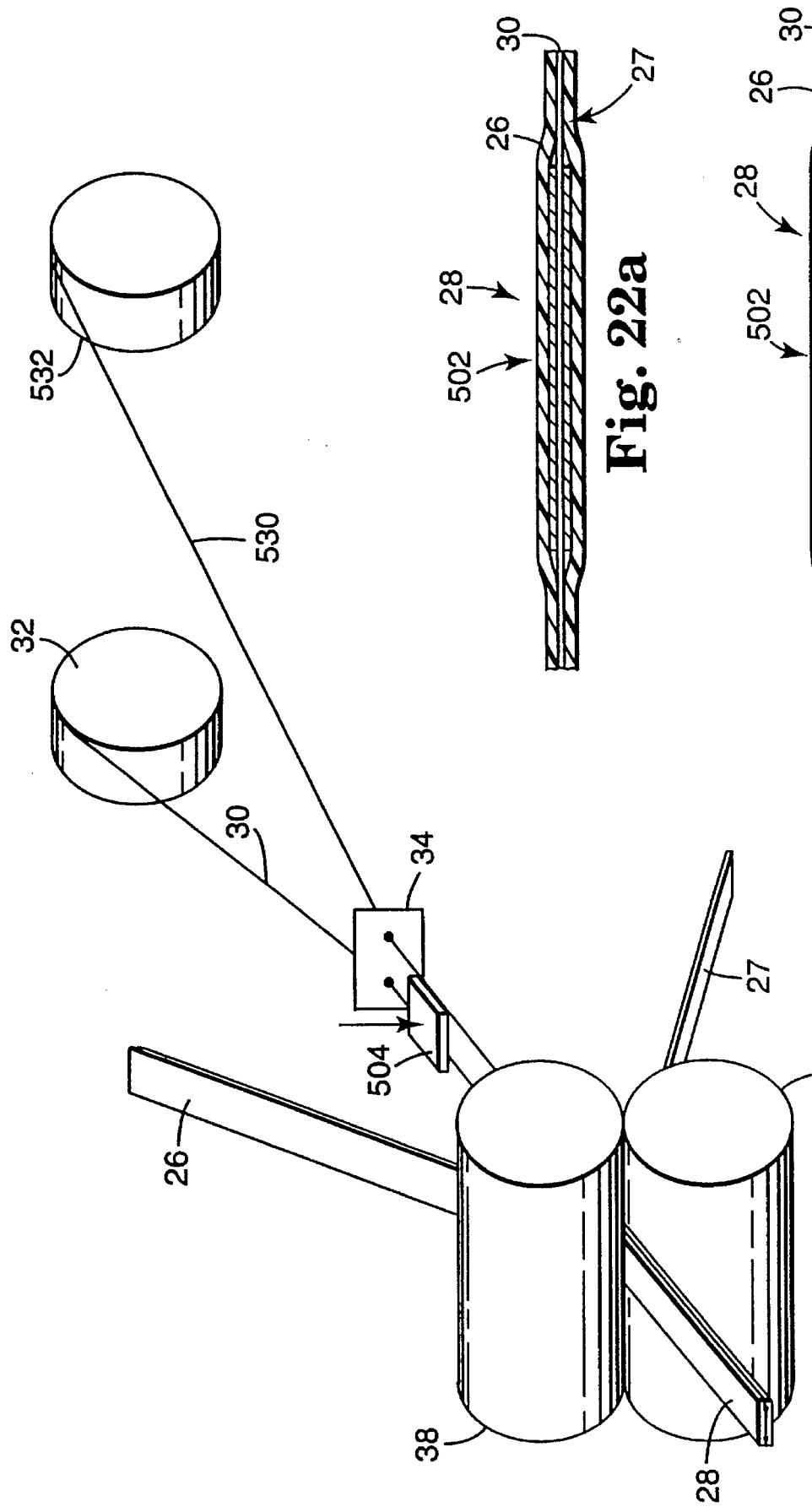

FIBER OPTIC RIBBON CABLE WITH PRE-INSTALLED LOCATIONS FOR SUBSEQUENT CONNECTORIZATION

This application is a continuation-in-part of co-pending U.S. patent application Ser. No. 08/456,571, filed Jun. 1, 1995, entitled "FIBER OPTIC RIBBON CABLE ASSEMBLY AND METHOD OF MANUFACTURING SAME," now U.S. Pat. No. 5,574,817, which is assigned to the assignee of the present invention, the disclosure of which is hereby incorporated by reference in this application.

FIELD OF THE INVENTION

The present invention relates generally to optical fiber transmission media. In particular, the present invention relates to fiber optic ribbon cables having access points for subsequent connectorization incorporated into the ribbon cable during manufacture.

BACKGROUND OF THE INVENTION

Optical fiber ribbon cables are well known for the transmission of optical signals. Use of optical cables, including optical fiber ribbon cables, has generally been limited to long-haul trunking installations where the improved transmission characteristics of the optical fibers justify the greater expense and difficulty associated with their manufacture and installation. As the demands on communication media continue to increase, the advantages of using optical cable for transmission of signals across shorter distances or, for interconnecting local devices, continues to grow. Unfortunately, the costs associated with the production of optical fiber cable assemblies, and in particular with the installation of connectors on optical fiber ribbon cables, continue to limit the wide spread application of optical fiber transmission media for these applications.

Traditionally, a single fiber optical cable is assembled by coating an optical fiber with a buffer layer and then encasing the buffered optical fiber within a Kevlar® sheath that provides tensile strength and a vinyl outer jacket that serves as an environmental shield. Multi-fiber optical cables are assembled in a similar manner by bundling multiple buffered optical fibers within the center of a Kevlar® sheath and corresponding outer jacket. The difficulty with a multi-fiber bundled optical cable is in providing an economic, convenient and reliable system for installing a connector on the ends of the optical fibers so as to provide a finished fiber optic cable assembly.

As an alternative to a multi-fiber bundled optical cable, optical fiber ribbons have been developed in which multiple optical fibers are aligned and maintained in a planar configuration. U.S. Pat. No. 3,920,432, issued to Smith describes an early method of fabricating an optical fiber ribbon cable in which a plurality of glass optical fibers are carried by a grooved holder with a plurality of spacing fibers of triangular cross-section continuously fed into the spaces between adjacent optical fibers in the holder. The spacing fibers are then melted to secure the optical fibers within the holder. The advantage of this technique is that the optical fibers are accurately aligned within the holder, thereby aiding in the ability to easily interface the fiber optic ribbon with an optical connector. The disadvantage is that this technique limits the mechanical performance of the fiber optic ribbon by requiring that the holder be provided for the entire length of the ribbon and that the holder have sufficient structural integrity to accurately maintain the positioning of the optical fibers within the holder. In addition, the requirement that the fiber optic ribbon be heated in order to melt the triangular-type spacing fibers to secure the optical fibers within the holder subjects the fiber optic ribbon to thermal stress.

U.S. Pat. No. 4,289,558 issued to Eichenbaum et al. and U.S. Pat. No. 4,980,007, issued to Ferguson describe improved methods of fabricating a fiber optic ribbon in which buffered optical fibers are positioned adjacent one another in a planar orientation and then sandwiched between the adhesive layers of a pair of thin binding tapes. The resulting fiber optic ribbon is then encased in Kevlar® fibers and a plastic sheath, for example, to provide tensile strain relief and environmental protection for the optical fibers. In this technique, the alignment of the optical fibers within the ribbon is created and maintained by relying on the dimensional characteristics of the buffer layer surrounding the optical fibers and then abutting adjacent fibers so as to achieve a uniform spacing across a cross-sectional width of the fiber optic ribbon. While these techniques provide a clear manufacturing advantage to the technique disclosed by Smith in U.S. Pat. No. 3,920,432, the problems which are created by utilizing these techniques are an increased difficulty in attaching, aligning and installing optical connectors on the ends of the fiber optic ribbon in order to create a finished fiber optic ribbon cable assembly.

Numerous optical connectors have been developed to aid in the connection and splicing of fiber optic ribbons. Examples of connectors which are designed to terminate an end of a fiber optic ribbon are shown and described in U.S. Pat. No. 3,864,018, issued to Miller, U.S. Pat. No. 4,793, 683, issued to Cannon, Jr., et al., and U.S. Pat. No. 5,309, 537, issued to Chun, et al. In contrast, U.S. Pat. No. 3,871,935, issued to Cloge, et al. and European Patent Publ. No. 0 613 031 81 both describe methods for encapsulating a middle portion of a fiber optic ribbon within an optical connector assembly that is then severed in half to form opposed ends of a pair of optical connectors. In both of these references, the protective jacket and buffer surrounding the optical fibers are chemically removed in a middle portion of the ribbon and the resulting bare optical fibers are positioned within an encapsulating mold into which a bonding material is injected to secure the optical fibers. Once secured, the molded assembly is divided in half along a plane perpendicular to the axis of the optical fibers, thereby exposing ends of the fibers which can be polished for alignment and/or abutment to other optical fiber ends. The advantages of these encapsulation connector techniques are that they involve less manipulation and mechanical stress of the optical fibers than the technique taught by Smith. The disadvantages are that the stripping step subjects the optical fibers to potential damage and that the alignment of optical fibers in the molded assembly is not certain due to the potential movement of optical fibers during the encapsulating process. Additionally, this process is very labor intensive and not easily duplicated in the field where a ribbon cable has already been installed.

It would be desirable to provide a ribbon cable capable of easy field connectorization. Currently there are two primary multi-fiber connectors, AT & T's MAC™ connector and the MT™ connector made by U.S. Conec. The MAC™ connector made by AT & T is not designed to be field installable at all. The MT™ connector can be field installed, but not simply. When a field technician desires to insert an MT™ connector onto an existing ribbon cable, the technician cuts the ribbon cable. The insulation jacket surrounding the ribbon cable is typically slit longitudinally to allow the insulation jacket to be peeled back. If the ribbon cable is cut too deeply at this point, the optical fibers could be scratched and damaged. Any strengthening members in the ribbon cable must also be peeled back. After peeling back the insulation jacket and any strengthening members that may be present, the technician is left with a fiber ribbon comprising a plastic ribbon coating encapsulating a series of optical fibers.

The tool used to strip the plastic ribbon coating from the optical fiber is usually a hot blade stripper. This tool heats up the entire end of the ribbon which is being stripped and then has two blades that come towards one another to cut the ribbon coating and pull the coating off of the fibers. This step often causes damage to the fibers because it is very easy to cut too deeply with the blades and therefore damage the fibers. Once the fibers are exposed and are cleaned with alcohol to remove any remaining coating residue or particles, the connector must be correctly filled with the appropriate amount of adhesive. Then the fibers are manually inserted through holes in the connector. Once this is done, the adhesive must be cured to secure the fibers on the connector.

While fiber optic ribbon cables have expanded the use of optical fibers, the existing methods of stripping and connectorizing fiber optic ribbon cables are very labor intensive and subject the optical fibers to potential damage due to the difficulty in stripping the protective jacket and buffer. Attempting to thread the optical fibers through the holes of a connector is also a very tedious task. If even a single fiber is broken in either part of this process, a new cut of the ribbon cable must be made and the entire process must be redone. Consequently, it would be desirable to provide an improved system for stripping and connectorizing fiber optic ribbon cables subsequent to cable fabrication.

SUMMARY OF THE INVENTION

The present invention is a fiber optic ribbon cable having access points manufactured in line with the ribbon cable so as to provide a simple access point to the fibers for subsequent field connectorization and a method for installing a connector thereon. At least one, preferably a pair of adhesive tape layers is provided about the optical fibers to create a fiber optic ribbon cable. At least one release element is provided between the adhesive tape layers and the optical fibers at one or more access points along the ribbon cable to form a release location to allow easy access to the fibers therein. By having the access points manufactured in line with the fiber optic ribbon cable, the resulting ribbon cable is much easier to connectorize in the field.

The present invention also discloses a method for installing a connector onto a ribbon cable comprised of at least one, preferably a pair of adhesive tape layers and at least one optical fiber, and having at least one release element at any number of in-line access points. A technician must first locate one of the access points on the ribbon cable. Once found, the cable is cut at the access point. After the cable is cut the adhesive tape layers may be easily peeled back exposing the optical fibers at the access points because the release elements prevent the adhesive side of the tape layer from adhering to the optical fibers at the access points. Once the tape layers are peeled back, a connector is then installed onto the exposed fibers. The release elements are then removed from the tape layers and the adhesive side of each tape layer is then secured to the outer surface of the connector. Finally, any excess tape is trimmed off.

BRIEF DESCRIPTION OF THE DRAWINGS

FIG. 21 is a schematic illustration of a method of manufacturing a second alternative embodiment of the present invention.

FIGS. 22a–f are a series of cross-sectional views of a third alternate embodiment of a connector being installed onto a ribbon cable made according to the present invention.

DETAILED DESCRIPTION OF THE PREFERRED EMBODIMENTS

Figure 1:
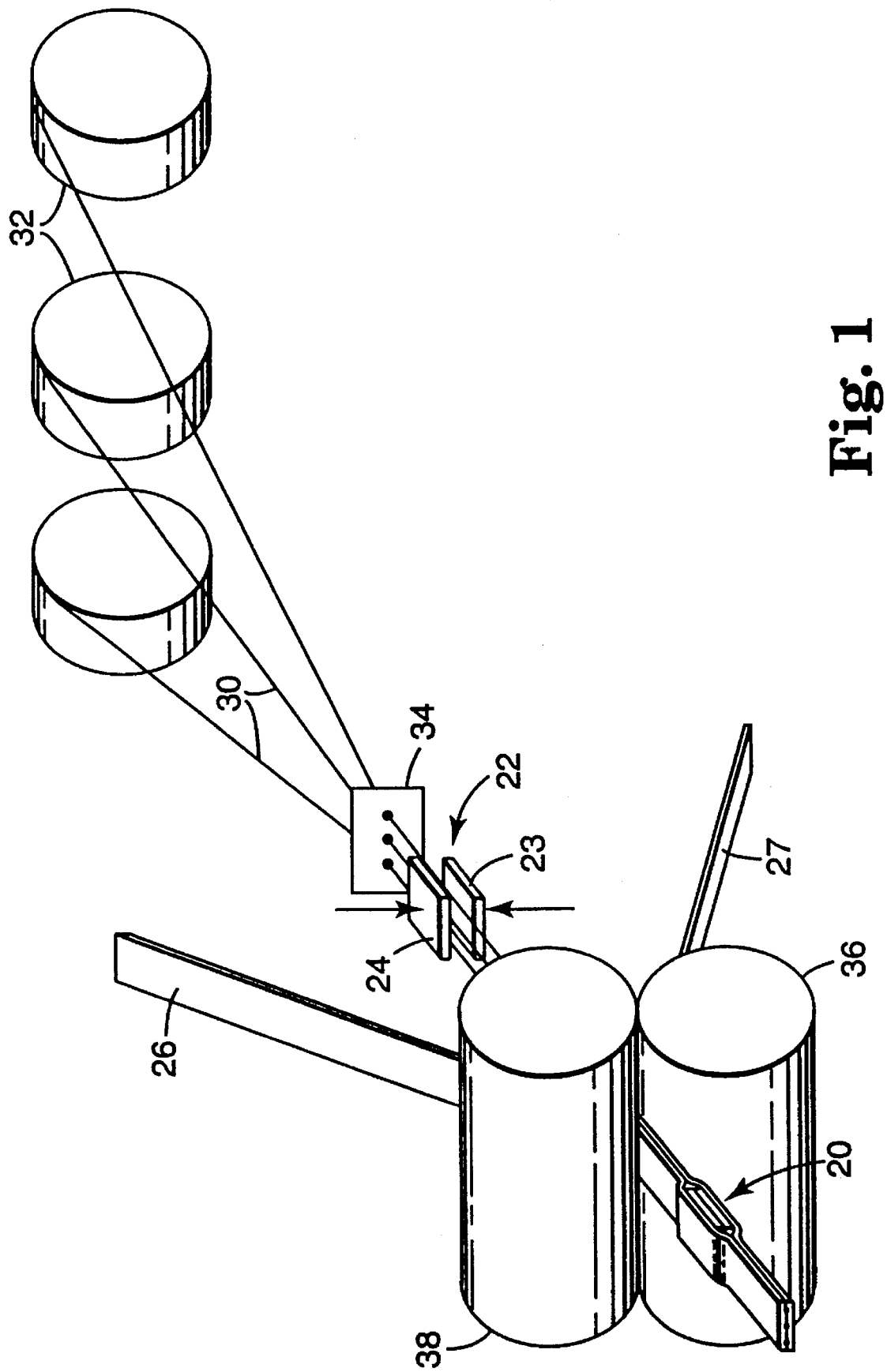
FIG. 1 is a schematic illustration of a method of manufacturing a fiber optic ribbon cable having integrated in-line connector assemblies.

This disclosure will first discuss the previous invention embodied in U.S. Pat. No. 5,574,817. After that, a complete description of the present invention will be given. Because of the numerous similarities, corresponding elements from the previous invention to the present invention will have like reference numerals.

Referring to FIG. 1, a method of producing a fiber optic ribbon cable assembly 20 will be described. At least one, preferably a plurality, of optical fibers 30 are drawn from a corresponding series of spools 32 holding such optical fibers 30 through a guiding comb 34. Guiding comb 34 is provided with structure to establish a fixed, lateral inter-fiber spacing between optical fibers 30. Preferably, this spacing corresponds with a fixed, lateral inter-fiber spacing of a connector assembly 22 which is preferably comprised of a pair of upper and lower connector components 23, 24. After optical fibers 30 are brought through guiding comb 34, connector components 23, 24 are positioned so as to sandwich optical fibers 30 therebetween, thereby fixing the lateral inter-fiber dimension within connector assembly 22. At a point farther down stream in the process, an upper adhesive tape 26 and a lower adhesive tape 27 are introduced to sandwich optical fibers 30 therebetween creating the fiber optic ribbon cable. Of course, it is understood that an equivalent structure may be obtained from a single adhesive tape which is folded around the optical fibers to form upper and lower tape layers. A pair of compression rollers 36, 38 are preferably used to supply the force necessary to secure upper adhesive tape 26 to lower adhesive tape 27 with optical fibers 30 being held therebetween and having an arbitrary and non-fixed, lateral inter-fiber separation distance, except for in those locations of optical fiber ribbon cable assembly 20 where connector components 23, 24 have been located. When present, optical connector components 23, 24 are also sandwiched between upper and lower adhesive tapes 26, 27.

Figure 15:
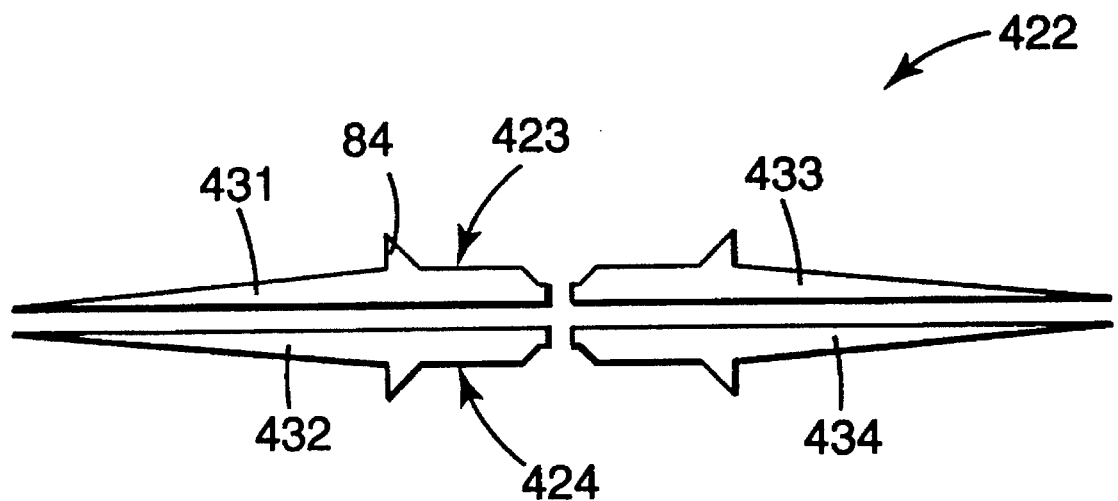
FIG. 15 is a side view of another alternate embodiment of a connector assembly.

In one embodiment, connector assembly 22 is comprised of a pair of connector components 23, 24, although it will be understood that other arrangements of connector assembly 22 are possible, such as four connector components (as shown in FIG. 15) or a unitary connector assembly having an aperture through which optical fibers 30 are threaded. It will be recognized that connector assembly 22 is usually cut along at least one axis that is generally perpendicular to the longitudinal orientation of optical fibers 30, however, it is possible to make this cut a small angle to perpendicular, for example, in order to aid in the prevention of reflections. Connector assembly 22 is preferably made of plastic, but may also be manufactured from ceramic or metal materials and may, for example, be comprised of a plastic body having a ceramic or metal insert corresponding to the portion of connector assembly 22 which interfaces with optical fibers 30.

In conventional installation of fiber optic cables, an optical connector on an end of one cable is joined to an optical connector on an end of another cable using an optical coupler. While an optical coupler is normally required in order to complete an interconnection between two cables, it should be recognized that it would be possible to include the mating structure of an optical coupler as part of a connector assembly as in FIG. 1. It also will be recognized that numerous combinations and configurations of mechanical connector members and connector orientation configurations can be accomplished in the embodiment of FIG. 1.

Figure 2:
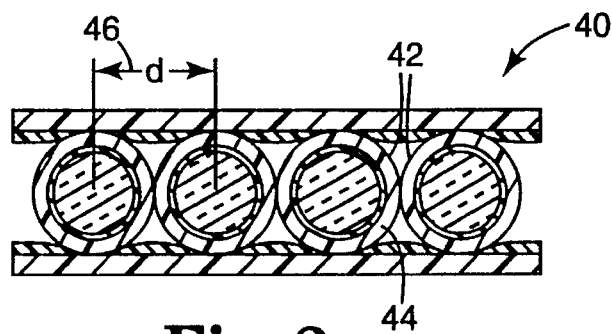
FIG. 2 is a cross-sectional view of a fiber optic ribbon cable of the prior art.

One of the advantages of assembling a ribbon cable with connector in line is that, by assembling optical fibers 30 within connector components 23, 24 prior to completing the remaining assembly of optical fiber ribbon cable assembly 20, it is not necessary to maintain specific inter-fiber distances or tolerances throughout the entire length of ribbon cable assembly 20. As shown in FIG. 2, the prior art technique of assembling a fiber optic ribbon cable 40 relies on positioning adjacent optical fibers 42 in a contiguous planar, abutting relationship. By doing so, the prior art relies on the thicknesses of a buffer layer 44 surrounding each adjacent optical fiber 42 to establish a fixed inter-fiber optical separation d shown at 46. While this process works to define interfiber spacings 46 along a longitudinal length of fiber optic ribbon cable 40, it does not work well enough to provide for consistent, accurate inter-fiber spacings 46 which could be used for optical alignment within an optical connector.

Figure 3:
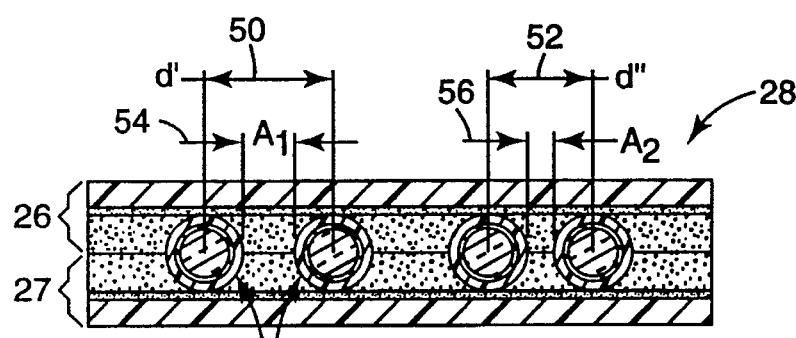
FIG. 3 is a cross-sectional view of a fiber optic ribbon cable.

In contrast to fiber optic ribbon cable 40, fiber optic ribbon cable 28 (where 28 represents a cable or portion of cable manufactured according to the present invention, but not containing embedded connector components) as shown in FIG. 3 does not attempt to maintain a precisely fixed, lateral relation among optical fibers 30 when sandwiched between tape layers 26, 27. As a result, distances d' shown at 50 and d" shown at 52 between adjacent optical fibers 30 may or may not be identical. Each distance d' and d" will generally include a space between laterally-adjacent optical fibers, $A_1$ shown at 54 and $A_2$ shown at 56, although it will be recognized that because no fixed lateral inter-fiber spacing is dictated when optical fibers 30 are positioned within tape layers 26, 27, it would also be possible for adjacent optical fibers 30 to, in some situations, be in an abutting relationship.

By assembling optical fibers 30 within connector assembly 22 prior to completing the remaining assembly of optical fiber ribbon cable assembly 20, significant time and money are saved with the installation of optical connectors on the optical fibers. The fixed, lateral inter-fiber spacing within connector components 23, 24 establishes a fixed pitch of optical fibers 30. Unlike the prior art techniques, optical fibers 30 are not subjected to either thermal or chemical stresses during the process of installing the optical connector assembly. In addition, there is absolute certainty of the relative position of the optical fibers 30 within connector components 23, 24. Finally, the manufacture of the integrated, in-line optical connector assembly 22 can be incorporated into a continuous manufacturing process, thereby significantly reducing the production costs of fiber optic ribbon cable assembly 20 as compared to prior techniques for the manufacture or field-installation of optical connectors on fiber optic ribbons.

Figure 4:
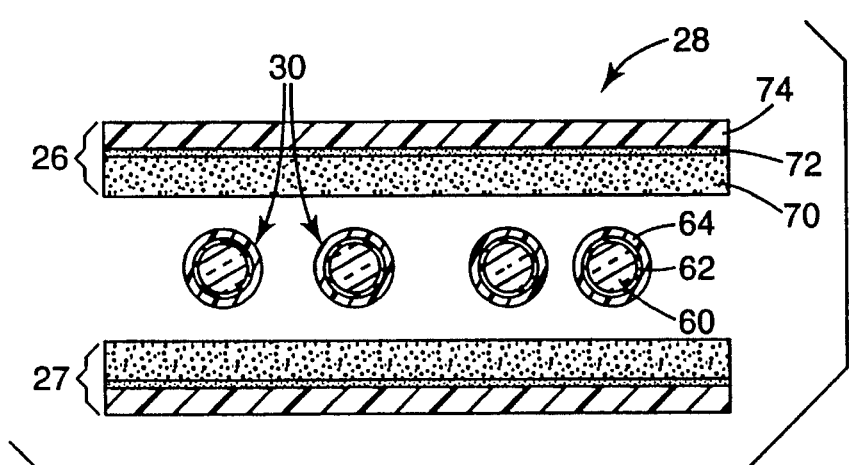
FIG. 4 is an exploded cross-sectional view of a fiber optic ribbon cable showing layered details of adhesive tape and optical fibers.

Referring now to FIG. 4, an embodiment of tape layers 26, 27 and optical fibers 30 will be described. FIG. 4 shows an exploded cross-sectional view of ribbon cable 28 prior to sandwich assembly of tape layers 26, 27 with optical fibers 30 therebetween. In this embodiment, optical fibers 30 are comprised of an optical core 60 composed of a material selected from the set of glass, plastic or air. Fiber optic core 60 is surrounded by a cladding layer 62 composed of a material selected from the set comprising glass, plastic or metal.

The optical fiber 30 may also include a buffer layer 64 composed of a material selected from the set of plastic, metal carbon, ceramic or any combination thereof. In a preferred embodiment, optical fibers 30 are TECS™ hard clad fiber FT-200-EMA, available from 3M Company, St. Paul, Minn. although it should be noted fiber optic ribbon cables 20 utilizing a variety of different optical fibers would also be acceptable.

In one embodiment, tape layers 26, 27 are each three-layer planar tape assemblies comprised of an inner encapsulating layer 70, an adhesive layer 72 and an outer protective layer 74. Encapsulating layer 70 serves to encapsulate optical fibers 30 and is preferably comprised of a deformable material such as pressure sensitive adhesive, thermoset adhesive, thermoplastic adhesive, radiation-curable adhesive, gel, foam, fibrous material, deformable plastic or any combination thereof. Adhesive layer 72 is interposed between inner layer 70 and 74 to secure each to the other and is preferably comprised of a material such as pressure sensitive adhesive, thermoset adhesive, thermoplastic adhesive, radiation curable adhesive, mechanically interlocking structures or any combination thereof. Outer protective layer 74 serves as the outer jacket for fiber optic ribbon cable 28 and is preferably comprised of a vinyl or plastic material which is suitable for a variety of environmental applications, or may be comprised of plastic, metal fabric or any combination thereof. Preferably layers 72 and 74 are comprised of Scotch® brand tape No. 474 and layer 70 is comprised of transfer adhesive tape No. 9465, both of which are available from 3M Company, St. Paul Minn.

Figure 5:
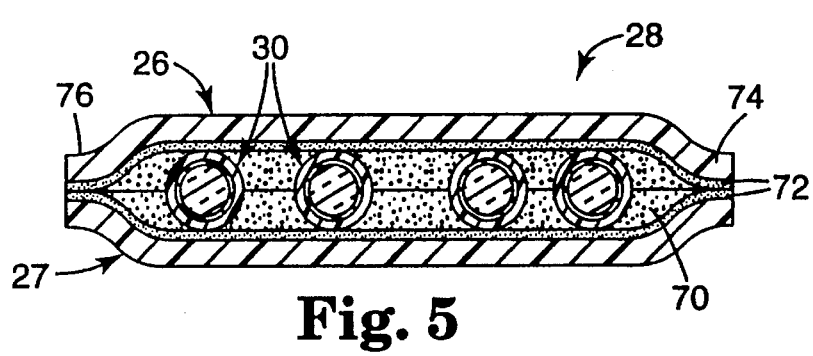
FIG. 5 is a cross-sectional view of the fiber optic ribbon cable of the invention with sealed lateral edges.

In FIG. 5, protective layer 74 and adhesive layer 72 are shown extended beyond encapsulating layer 70 in an area shown at 76, for example, such that the lateral edges of fiber optical ribbon cable 28 are effectively sealed from environmental contamination. While it is understood that, for economic reasons, outer layer 74 is intended to serve as an outermost jacket of ribbon cable 28, it would also be possible to enclose one or more ribbon cables 28 within an additional outer jacket layer, such as in the case where a larger fiber optic cable bundle is required for a long haul transmission application. In such an embodiment, it would also be possible to arrange the fiber optic cable 28 within an additional outer jacket such that the final cable would offer more structural integrity so as to prevent, for example, bending or crimping of optical fibers 30. One such embodiment would involve folding the generally planar orientation of cable 28 into an S-shaped configuration. Another alternate configuration would provide for a stacked orientation of multiples ones of cable 28. Still another embodiment would include an additional core member around which cable 28 could be wrapped, with the core member having a circular cross section, for example, to simulate a more traditional tubular shape for the final cable assembly.

Figure 6:
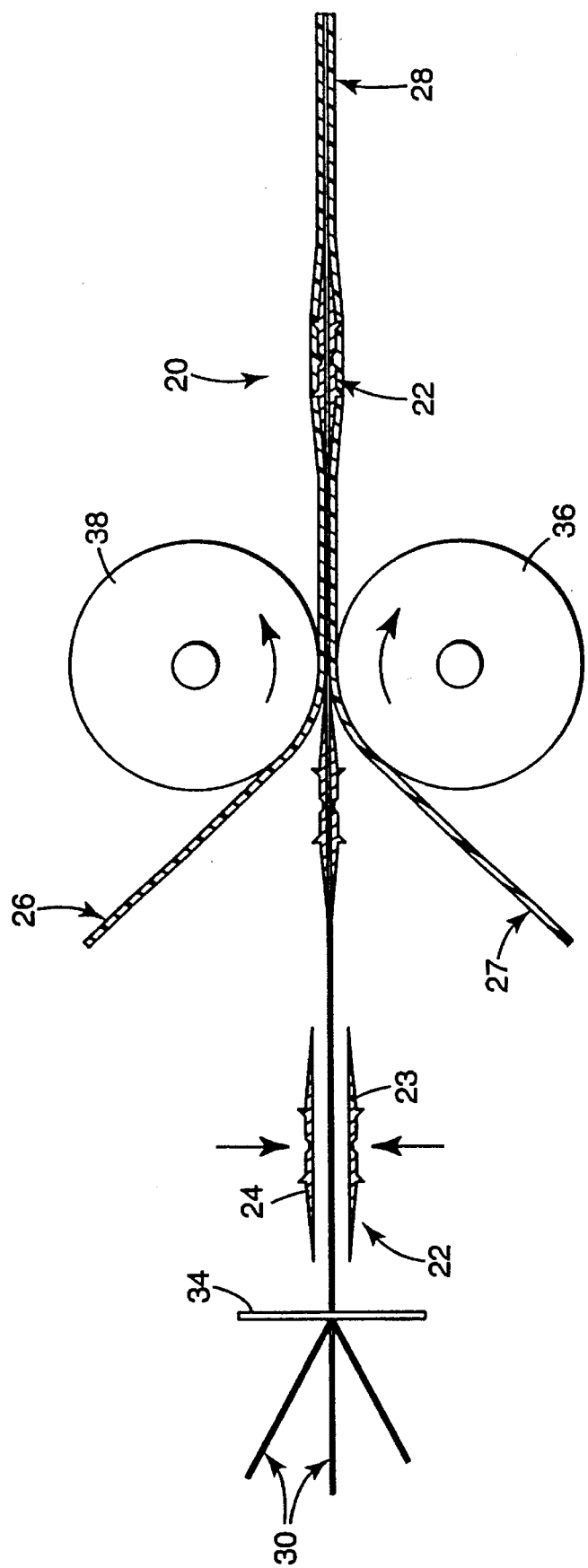
FIG. 6 is a schematic cross-section view of a process showing an application of integrated in-line connector assemblies onto the fiber optic ribbon cable.
Figure 7A:
FIGS. 7a–7d are a series of cross-sectional views of a fiber optic ribbon cable assembly demonstrating a preferred finishing technique for the integrated in-line connector assembly.
Figure 7B:
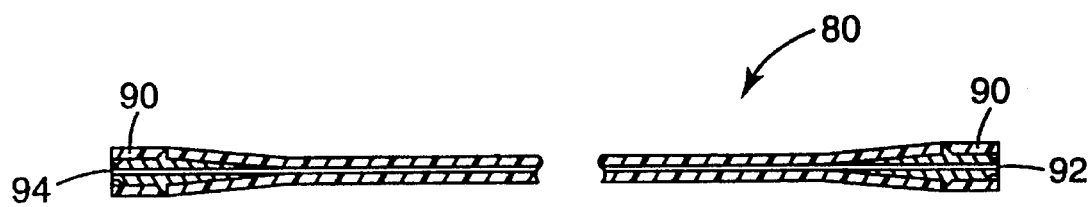
Figure 7C:
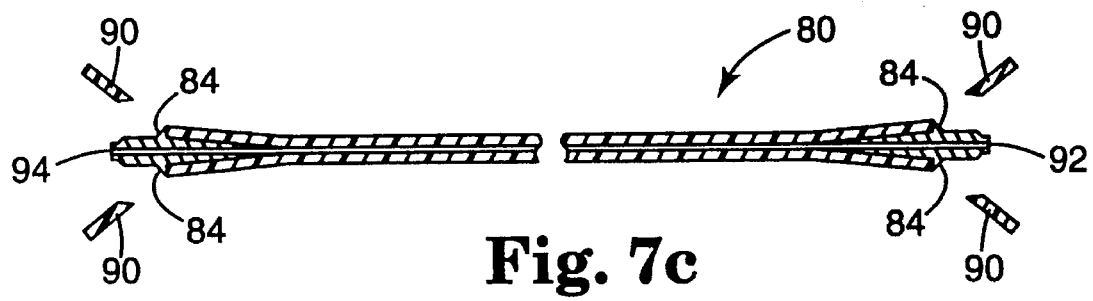
Figure 7D:
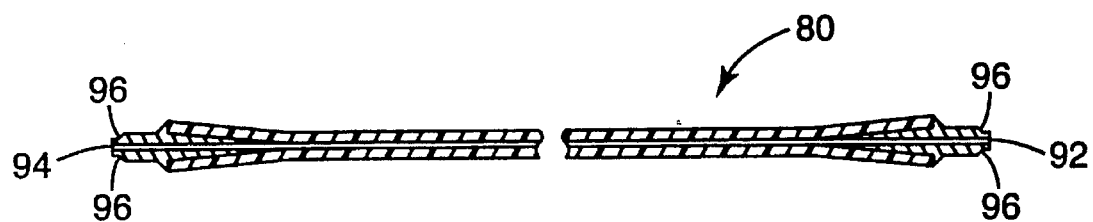

Referring now to FIG. 6, a side view of the assembly process of fiber optic ribbon cable assembly 20 is shown in which it is demonstrated how connector components 23, 24 are inserted at discrete locations along the longitudinal length of optical fibers 30. It will be seen by controlling the positioning and number of connector assemblies 22, it is possible to produce a continuous run of cable assembly 20 having a series of cable segments 80 (as shown in FIG. 7), each with a length effectively determined by the positioning of sequential connector assemblies 22.

FIGS. 7a–d show how cable segments 80 containing connector assemblies 22 can be created from the continuous run of cable assembly 20. Cable assembly 20 is cut along a center portion 82 of connector assembly 22. Center portion 82 is effectively defined between a pair of ridge structures 84 which extend outward from the body of connector assembly 22, for example. In a preferred embodiment, ridge structures 84 include a pointed edge which, in connection with the operation of rollers 36, 38, cuts or scores adhesive tapes 26, 27 to facilitate the removal of portions 90. To make cable assembly segment 80, cable assembly 20 is cut in an orientation generally perpendicular to the longitudinal orientation of optical fibers 30 in center portion 82 of each connector assembly 22. Once cut, a portion 90 of tape layers 26, 27 is removed from each end 92, 94 of cable segment 80, after which each end 92, 94 may or may not require further polishing at portions 96 to complete manufacture and assembly of cable segment 80.

Figure 8:
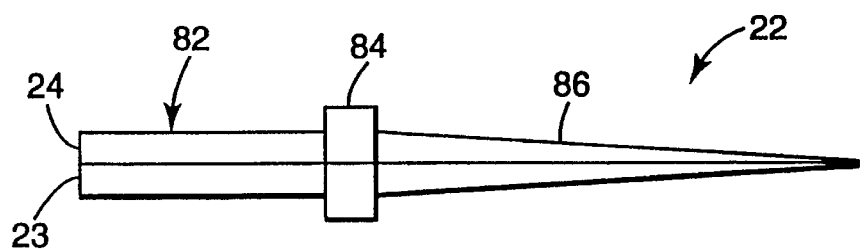
FIG. 8 is a side view of the integrated in-line connector assembly.
Figure 9:
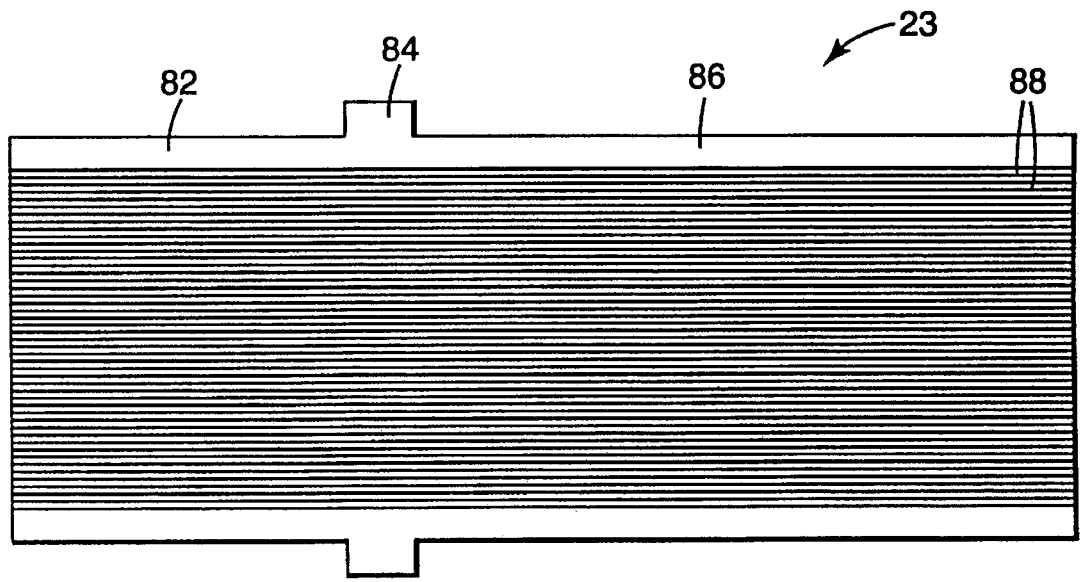
FIG. 9 is a top view of the lower connector component of the connector assembly of FIG. 8.
Figure 10:
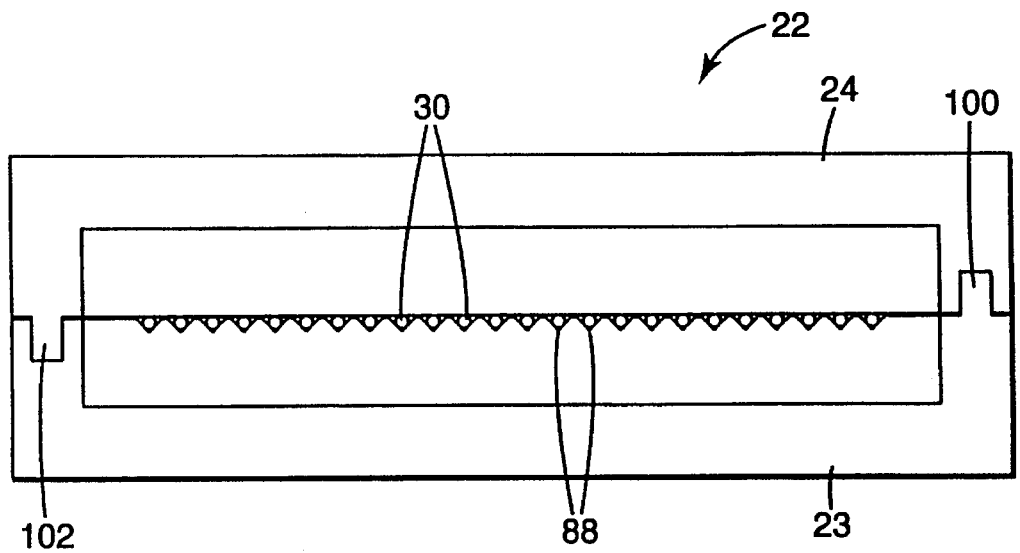
FIG. 10 is an end view of the connector assembly of FIG. 8.

Referring to FIGS. 8, 9 and 10, a more detailed description of the connector assembly 22 will be presented. As shown in FIG. 8, each connector assembly 22 includes two connector components 23, 24 each of which is generally comprised of a pair of mirror image quarter sections (two of which are shown in FIG. 8), each quarter section being constructed of three main portions: a center portion 82, a ridge portion 84, and a tapered portion 86. As shown in FIG. 9, a plurality of grooves 88 are defined longitudinally on an inner surface across the entire length of the bottom half connector component 23. As shown in FIG. 10, the shape and orientation of grooves 88 is preferably triangular to accommodate optical fibers 30 within the space thereby defined. The spacing between adjacent grooves 88 serves as the structure to define the fixed, lateral interfiber space between adjacent optical fibers 30 within connector components 23, 24.

It will be apparent that the particular spacing and dimensions of grooves 88 within connector assembly 22 can be selected so as to achieve the resulting desired spacing of optical fibers 30. Alternatively, grooves could be defined in upper connector half 24, or in both upper and lower connector components 23, 24. The extent and cross-sectional shape of grooves 88 may also be selected to best accommodate differing design considerations. For example, in a situation where it is desirable to prevent optical fibers 30 from being withdrawn from connector assembly 22, the depth of grooves 88 would be chosen so as to be shallow, thereby transferring the laminating force induced by rollers 36, 38 directly to optical fibers 30. In contrast, if it is desired that the laminating force of rollers 36, 38 not be applied to optical fibers 30, then the depth of grooves 88 could be selected so as to minimize or preclude such a result. It will also be seen that cross-sectional shapes other than triangular could be chosen, such as semi- circular, or rectangular.

In one embodiment, connector assembly 22 includes mating details as shown at 100, 102 in FIG. 10 to assist in the alignment and compression of connector components 23, 24 within the process of the present invention. Alternate embodiments would permit the assembly of connector components 23, 24 without such alignment details, or would include a mechanism for joining connector components 23, 24 such as an adhesive, a mechanical latching mechanism or welding, including ultrasonic welding, to secure connector components 23, 24 to one another.

Figure 11:
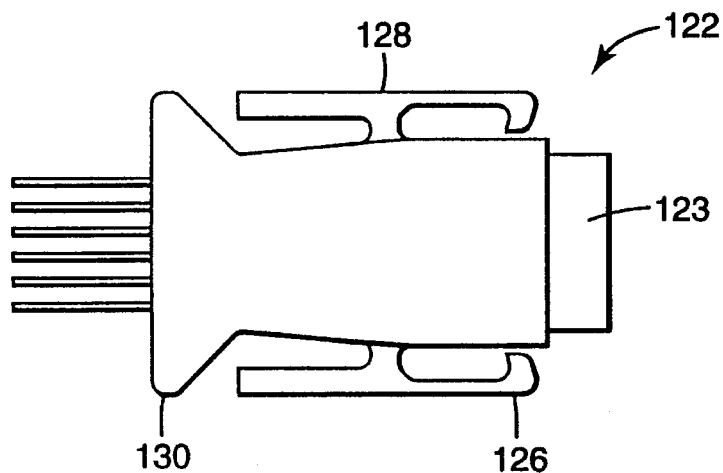
FIG. 11 is a top view of an alternate embodiment of the connector assembly including mechanical attachment features.
Figure 12:
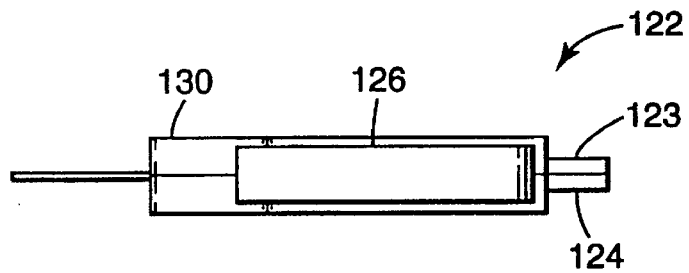
FIG. 12 is a side view of the alternate embodiment of the connector assembly shown in FIG. 11.

Referring now to FIGS. 11 and 12, an alternate embodiment of a connector assembly 122 is shown. In this embodiment, an upper connector component 123, and lower connector component 124 are assembled as previously described. Connector assembly 122 includes additional structure in the form of mating attachments 126, 128 and flange 130 which are integrally formed with connector 122.

Figure 13:
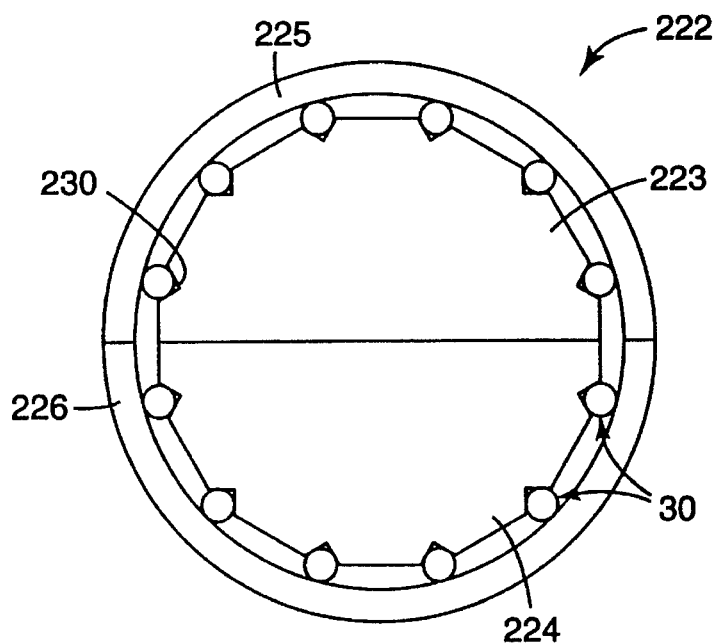
FIG. 13 is an end view of an alternate embodiment of a connector assembly.

Although the orientation of optical fibers 30 is generally planar in order to facilitate formation of a planar ribbon cable, alternate longitudinal arrangements of optical fibers 30 are also contemplated. In an alternate embodiment of a connector assembly 222 shown in FIG. 13, connector halves 223, 224 have a non-planar orientation. In this embodiment, each connector half 223, 224 would comprise a semi-circular cross-sectional configuration having grooves 230 defined in a peripheral surface thereof and would also have a corresponding outer portion 225, 226 between which optical fibers 30 would be disposed. In this embodiment, for example, it would be possible to have optical fibers 30 braided, for example, in those segments of ribbon cable assembly 20 between connector halves 223, 224 at a point where connector assembly 222 is to be inserted, the braiding of optical fibers 30 would cease and optical fibers 30 would be directed onto grooves 230 of connector halves 223, 224. Although this embodiment suffers from the disadvantage of having a larger connector surface than would otherwise be required for a planar configuration of a like number of optical fibers 30, the remainder of fiber ribbon cable assembly 20 being in a round cross-sectional configuration would offer symmetrical bend characteristics for the resulting final cable assembly.

Figure 14:
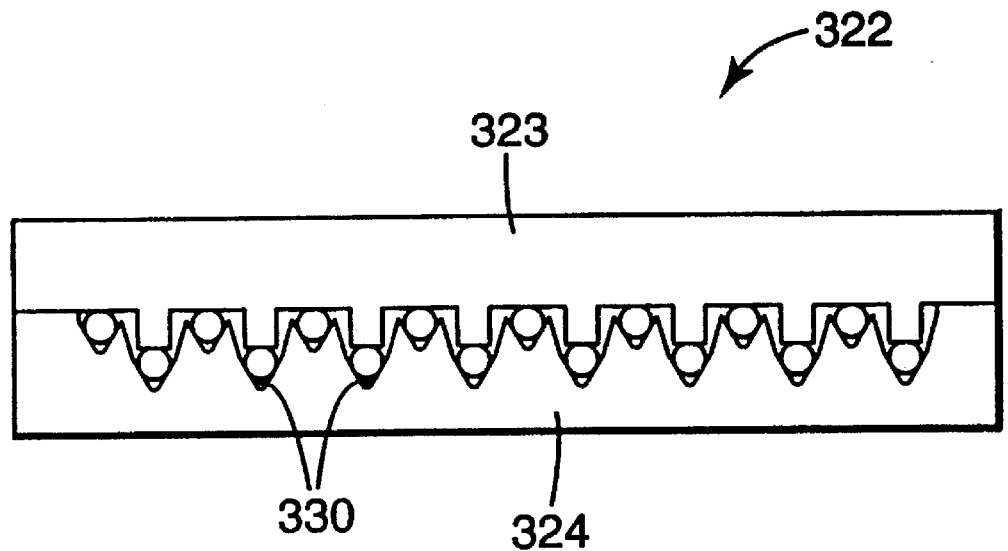
FIG. 14 is an end view of another alternate embodiment of a connector assembly.

In another alternate embodiment of a connector assembly 322 shown in FIG. 14, another non-planar orientation of optical fibers 30 is shown. In this embodiment, each connector component 323, 324 is similar to connector components 23, 24 except that grooves 330 on one or both surfaces of connector components 323, 324 are arranged in a non-planar configuration. Such a non-planar configuration would be useful, for example, in a situation where a top row of optical fibers are being used for transmitted signal channels and a bottom row of optical fibers are being used for received signal channels.

In another alternate embodiment of a connector assembly 422 shown in FIG. 15, connector assembly 422 consists of four pieces 431, 432, 433 and 434, with upper connector component 423 being comprised of pieces 431 and 433 and lower connector component 424 being comprised of pieces 432 and 434. In this embodiment, connector components 423 and 424 are split in the middle so that only optical fibers 30 and tape layers 26, 27 need be severed perpendicular to the longitudinal orientation of optical fibers 30 in order to create a fiber optic ribbon cable assembly.

Figure 16:
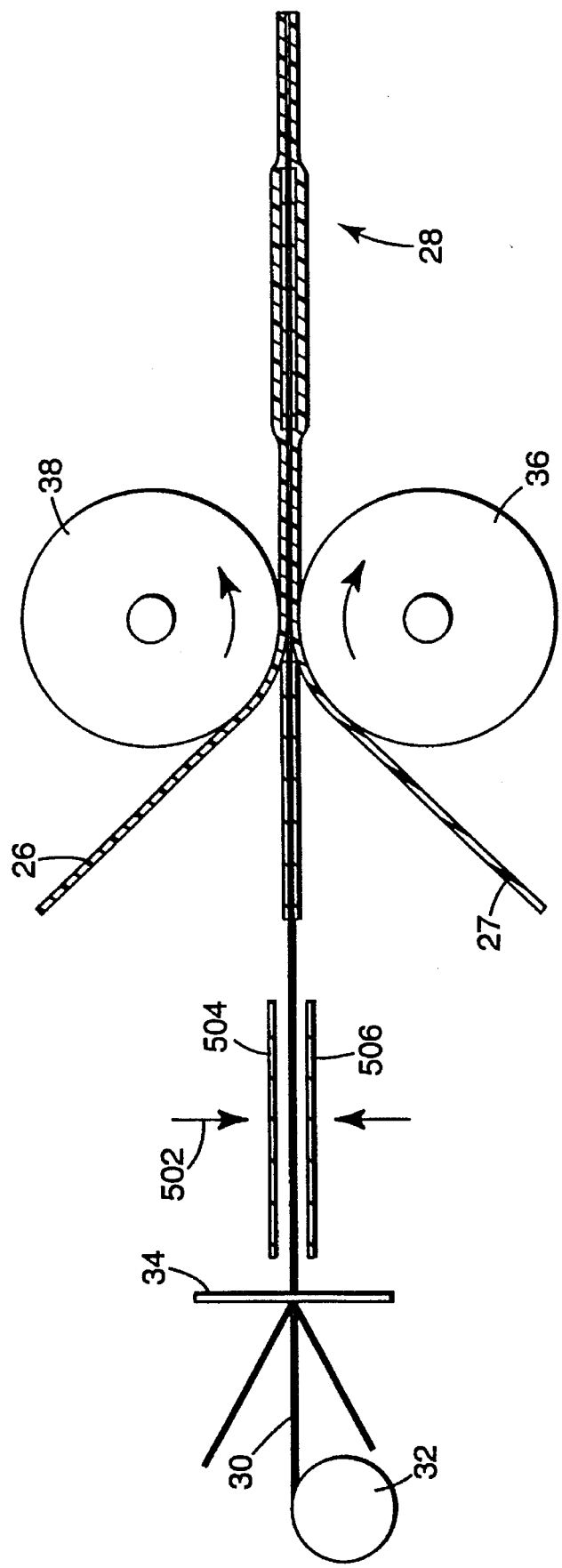
FIG. 16 is a schematic cross-section view of the process of the present invention showing the application of the integrated inline release assemblies into the fiber optic ribbon cable.
Figure 17A:
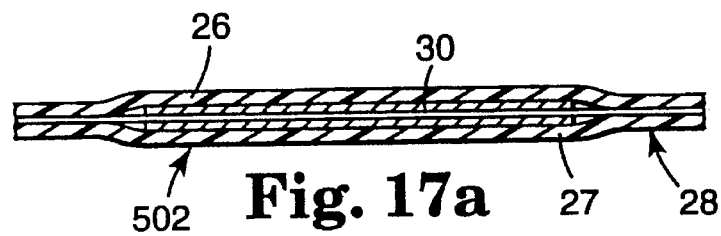
FIGS. 17a–f are a series of side views of a connector being installed onto the ribbon cable made according to the present invention.
Figure 17B:
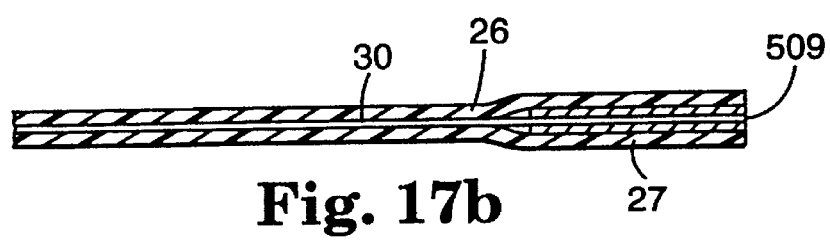
Figure 17C:
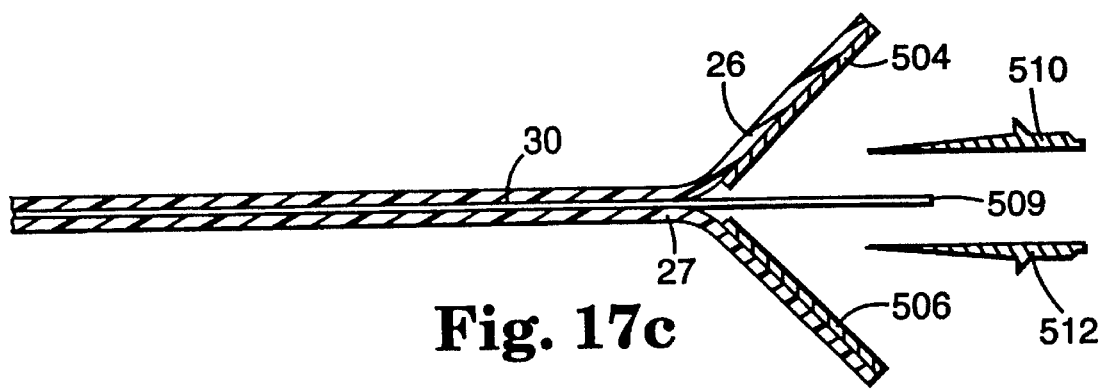
Figure 17D:
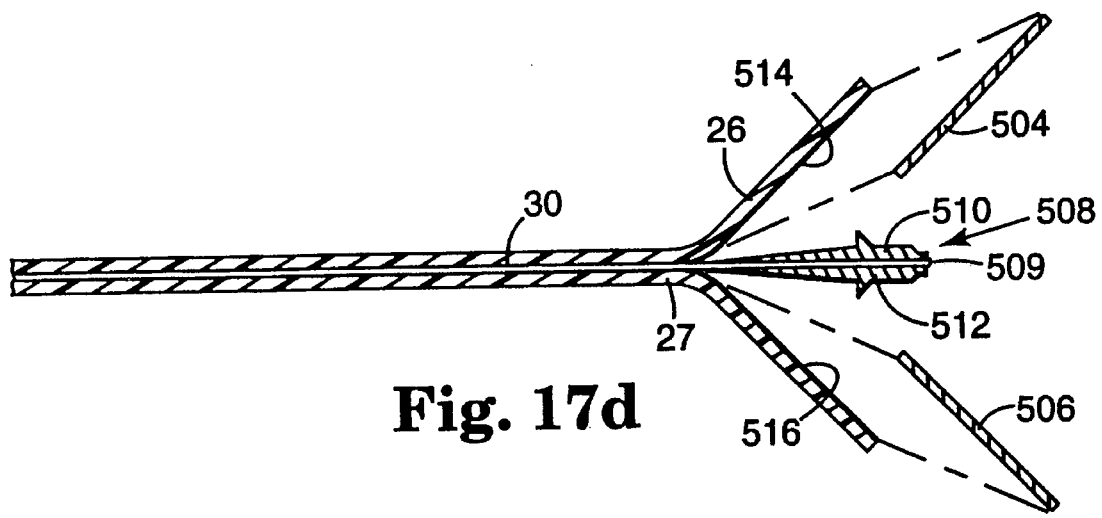
Figure 17E:
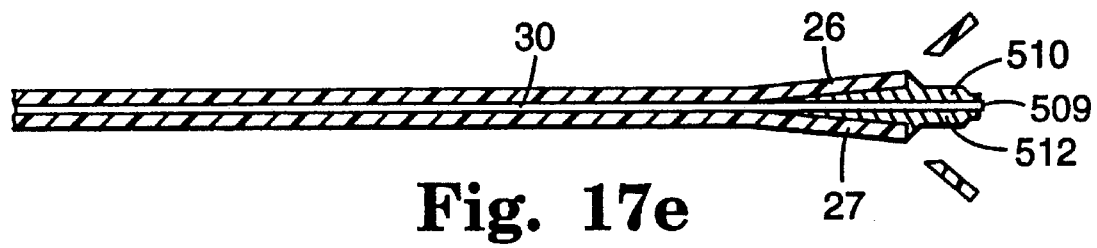
Figure 17F:
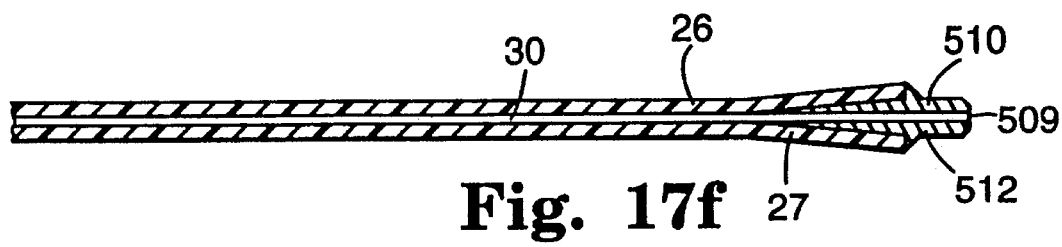

FIGS. 16 and 17 showing a preferred embodiment of the present invention will now be described in detail. FIG. 16 illustrates a side view of the assembly process of the fiber optic ribbon cable having release elements 504, 506 inserted at discrete access points 502 along the longitudinal length of optical fibers 30. The present invention will be described with reference to a multifiber ribbon cable 28, but it should be understood that the present invention would also apply to single fiber cables. Ribbon cable 28 may be spooled into a long continuous run or divided into shorter segments as needed without detracting from the application of the present invention. As in FIG. 1, at least one optical fiber 30 is drawn from a corresponding spool 32 which holds optical fibers 30. Fibers 30 are then drawn through a guiding comb 34. Guiding comb 34 is provided with structure to establish a fixed, lateral interfiber spacing between optical fibers 30. As described above, maintaining specific inter-fiber distances or tolerances throughout the entire length of ribbon cable 28 is not necessary. Optical fibers 30 will be correctly aligned with a fixed pitch when a connector is installed as will be described below.

After optical fibers 30 are brought through guiding comb 34, release elements 504, 506 are positioned so as to sandwich optical fibers 30 therebetween. Release elements 504, 506 may be applied to the fibers themselves, or, in the alternative could be applied to the adhesive tapes 26, 27. At a point farther downstream in the process, an upper adhesive tape. 26 and a lower adhesive tape 27 are introduced to sandwich optical fibers 30 therebetween creating the fiber optic ribbon cable. A pair of compression rollers 36, 38 are preferably used to supply the force necessary to secure upper and lower adhesive tapes 26, 27 with optical fibers 30 being held therebetween. Where present, release elements 504, 506 are also sandwiched between upper and lower adhesive tapes 26, 27. As noted above, an equivalent structure may be obtained from a single adhesive tape which is folded around the optical fibers to form upper and lower tape layers. If desired, an appropriate release element could also be configured for this structure.

As was described with reference to the previous invention, optical fibers are comprised of an optical core composed of a material selected from the set of glass, plastic, or air. The fiber optic core is surrounded by a cladding layer composed of a material selected from the set comprising glass, plastic or metal. The optical fibers 30 may also include a buffer layer composed of a material selected from the set of plastic, metal, carbon, ceramic or any combination thereof. In a preferred embodiment, optical fibers 30 are TECS™ hard clad fiber FT-200-EMA, available from 3M Company, St. Paul, Minn., although it should be noted fiber optic ribbon cables utilizing a variety of different optical fibers would also be acceptable.

As was also previously described, tape layers 26, 27 are each three-layer planar tape assemblies comprised of an inner encapsulating layer 70, an adhesive layer 72 and an outer protective layer 74, illustrated in FIG. 4. Encapsulating layer 70 serves to encapsulate optical fibers 30 and is preferably comprised of a deformable material such as pressure sensitive adhesive, thermoset adhesive, thermoplastic adhesive, radiation-curable adhesive, gel, foam, fibrous material, deformable plastic or any combination thereof. Adhesive layer 72 is interposed between inner layer 70 and 74 to secure each to the other and is preferably comprised of a material such as pressure sensitive adhesive, thermoset adhesive, thermoplastic adhesive, radiation-curable adhesive, mechanically interlocking structures or any combination thereof. Outer protective layer 74 serves as the outer jacket for the fiber optic ribbon cable and is preferably comprised of a vinyl or plastic material which is suitable for a variety of environmental applications, or may be comprised of plastic, metal, fabric or any combination thereof. Preferably layers 72 and 74 are comprised of Scotch® brand tape No. 474 and layer 70 is comprised of transfer adhesive tape No. 9465, both of which are available from 3M Company, St. Paul, Minn.

Preferably, release elements 504, 506 are each approximately 15 centimeters in length and are spaced uniformly along a longitudinal orientation of ribbon cable 28, approximately one meter apart. It should be noted that greater or lesser lengths of release elements 504, 506, or varying lengths between release elements 504, 506 would be acceptable without departing from the spirit or scope of the invention. Release elements 504, 506 can be made of any material, preferably a flexible material, to which the adhesive tape will not adhere. Alternately, release elements can be comprised of a semi-flexible substrate to which an adhesion-inhibiting layer has been applied. Suitable substrate materials include, for example, plastic, metal, fabric, and paper, which could be treated to prevent adhesion in any number of ways well known in the art. Suitable materials for the adhesion-inhibiting layer include, for example, silicone, petroleum distillate, organic oil, plastic, low tack adhesive, wax, low surface-energy coating, and microstructured textured surfaces. In addition, release elements could be formed by applying an adhesion inhibiting coating directly to encapsulating layers 70. Release elements 504, 506 serve two primary functions. The first is to allow for quick access to optical fibers 30, encased in protective tape layers 26, 27.

The second is to preserve a fresh adhesive surface on tape layers 26, 27 as will be described in detail below.

As with FIG. 5 of the previous invention, the present invention may also be utilized having protective layer 74 and adhesive layer 72 extending beyond encapsulating layer 70 such that the lateral edges of fiber optical ribbon cable 28 are effectively sealed from environmental contamination. In this embodiment, release elements 504, 506 could be positioned only between encapsulating layer 70 and optical fibers 30, or could be positioned so as to extend laterally between adhesive layers 72 beyond encapsulating layer 70 such that all of the adhesive layer 72 is preserved with a fresh adhesive surface.

The present invention may also include a means for indicating where access points 502 are located along ribbon cable 28. The indication means may be a dyed marking line signifying access points 502 or a series of small cuts in ribbon cable 28 to pre-score the cable at access points 502. Ribbon cable 28 may also have a flag portion at one of the release elements 504, 506 which protrudes from the side of ribbon cable 28 at access points 502 as an indication of where to cut. This flag portion could be integrated as a lateral extension of release elements 504, 506, for example. It should be noted that these examples are not an exhaustive list of indication means, and many other means for indicating access points 502 are available without departing from the spirit or scope of the invention.

FIGS. 17a–f illustrate a series of side views of a connector being field installed onto a ribbon cable made according to the present invention. Cable 28 is cut along a center portion of access point 502 exposing an end 509 of fibers 30. Preferably, cable 28 is cut in an orientation generally perpendicular to the longitudinal orientation of optical fibers 30. Once cut, a portion of tape layers 26, 27, each having release element 504, 506 attached respectively, is peeled back from optical fibers 30 therein. A field installable connector 508 comprising a first connector portion 510 and a second connector portion 512 is then positioned about the exposed optical fibers 30. Connector portions 510, 512 are then secured about optical fibers 30 by means such as clamping or crimping. Release members 504, 506 are removed from adhesive tape layers 26, 27 to expose fresh adhesive surfaces 514, 516 respectively. Tape layers 26, 27 are then pressed onto connector 508 to positively secure connector 508 in cable 28. Finally, any excess tape from tape layers 26, 27 is removed. One additional step may or may not be required. That is, newly exposed ends 509 of optical fibers 30 may or may not require polishing.

Figure 18:
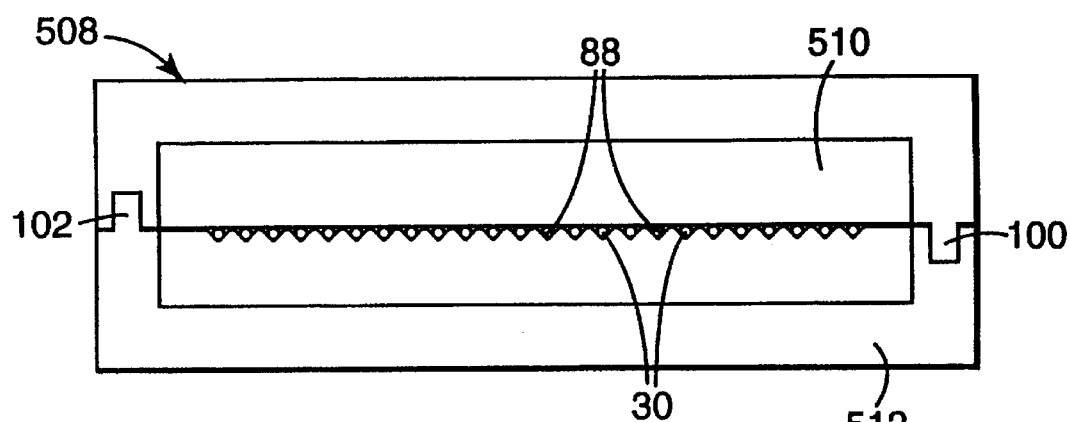
FIG. 18 is an end view of the installed connector of FIG. 17.

FIG. 18 illustrates an end view of connector assembly 508 secured about optical fibers 30. As described with reference to FIGS. 8, 9 and 10, a plurality of grooves 88 are defined longitudinally across the length of bottom connector portion 512. The shape and orientation of grooves 88 is preferably triangular to accommodate optical fibers 30 within the space thereby defined. The inter-groove spacing between adjacent grooves 88 serves as the structure to define the fixed, lateral inter-fiber space between adjacent optical fibers 30 within connector portions 510, 512.

The amount of time needed by a technician to put a connector on ribbon cable 28 in the field is greatly reduced if the cable is manufactured in accordance with the present invention. Also, the chance of damaging ribbon cable 28 while attempting to expose fibers 30 is greatly reduced, thereby almost eliminating the need to replace lengths of cable due to damaged fibers if ribbon cable made according to the present invention is used.

Figure 19A:
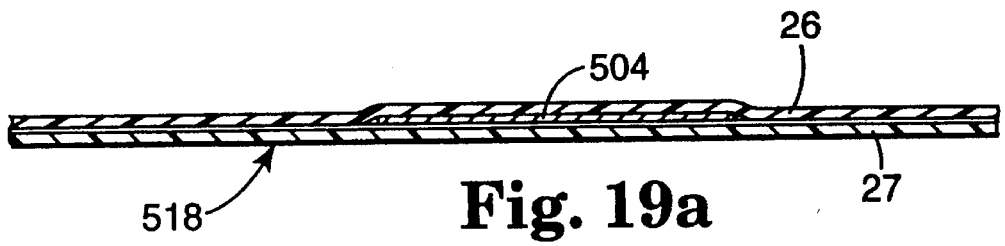
FIGS. 19a–f are a series of side views of an alternate embodiment of a connector being installed onto a ribbon cable made according to the present invention.
Figure 19B:
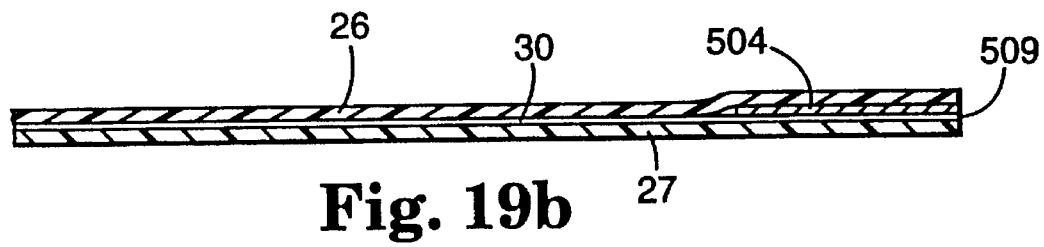
Figure 19C:
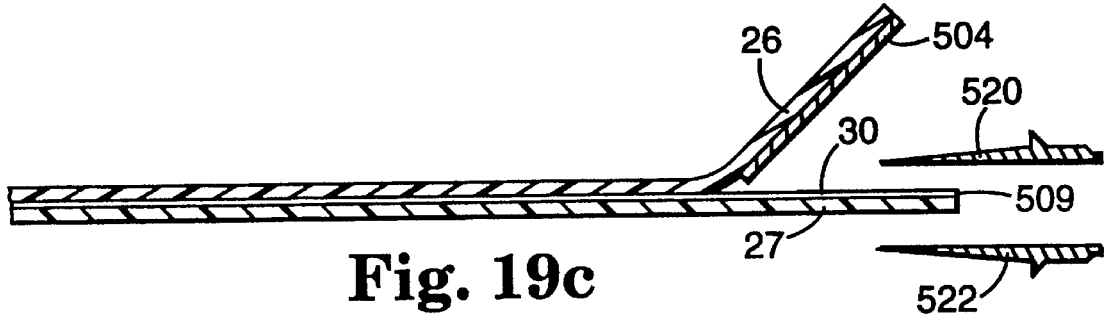
Figure 19D:
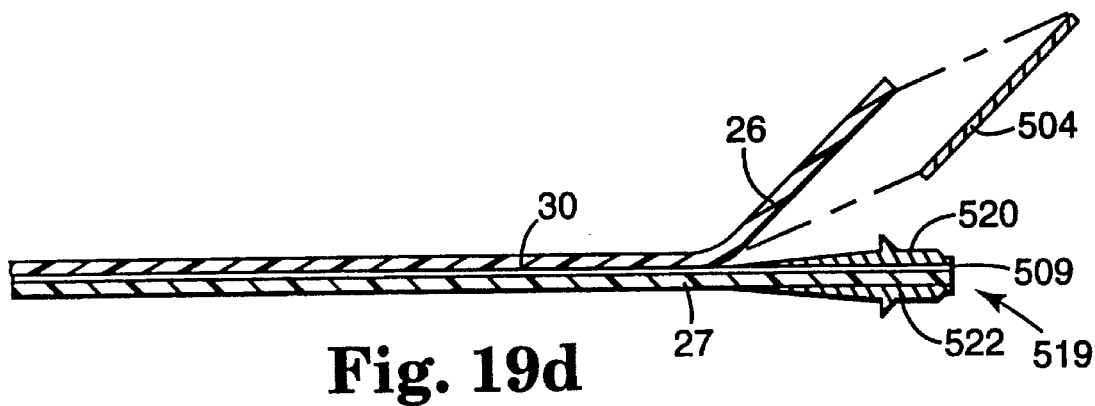
Figure 19E:
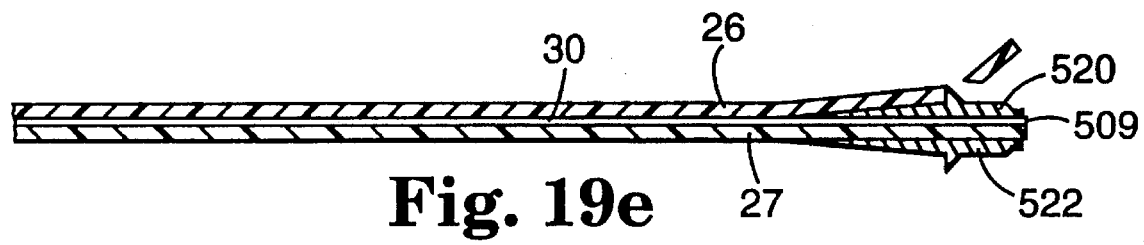
Figure 19F:
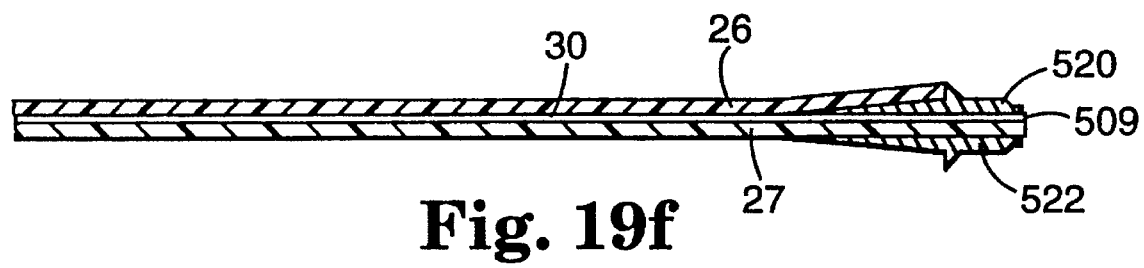
Figure 20:
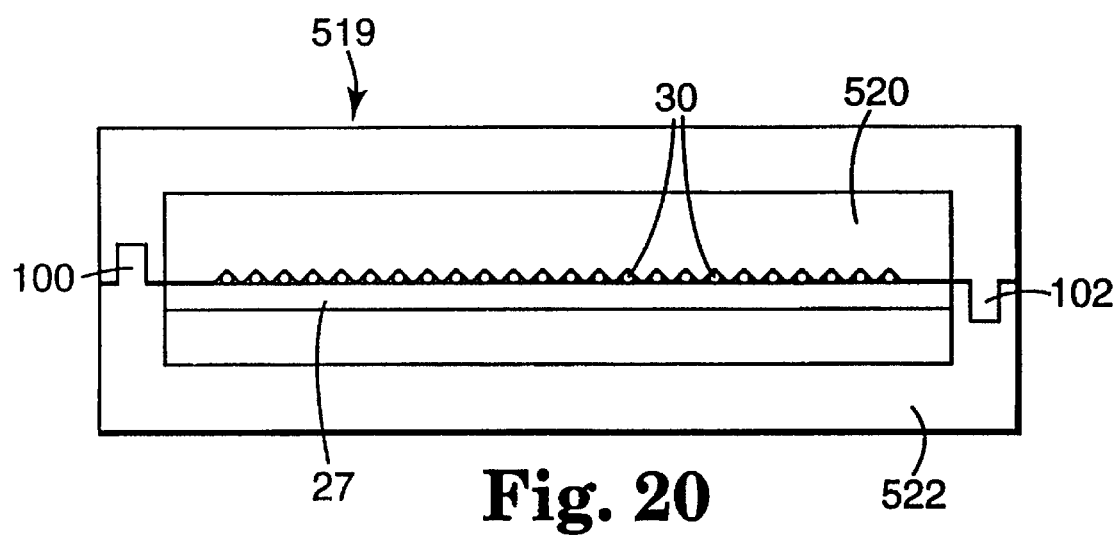
FIG. 20 is an end view of the alternate embodiment of FIG. 19f.
Figure 22C:
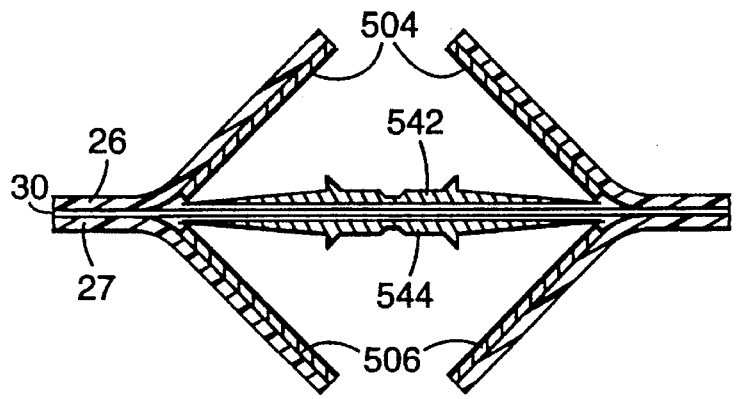
Figure 22D:
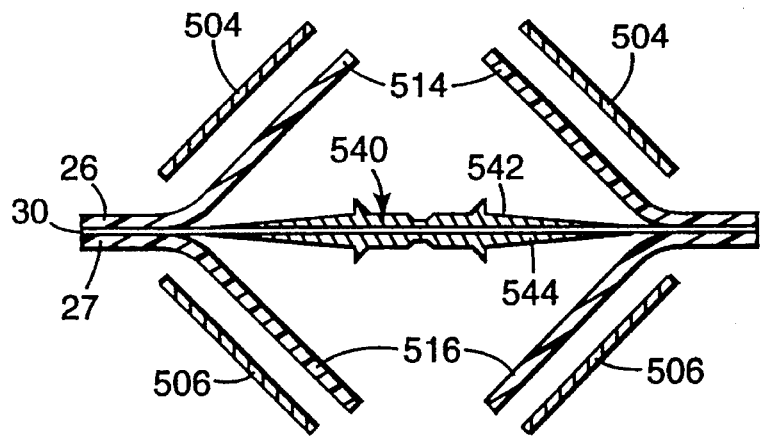
Figure 22E:
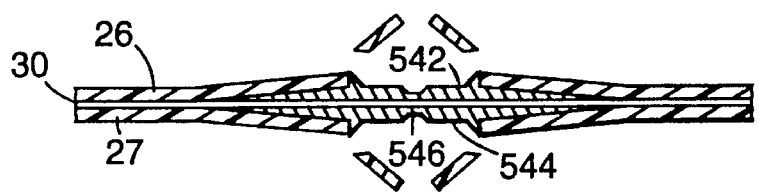
Figure 22F:
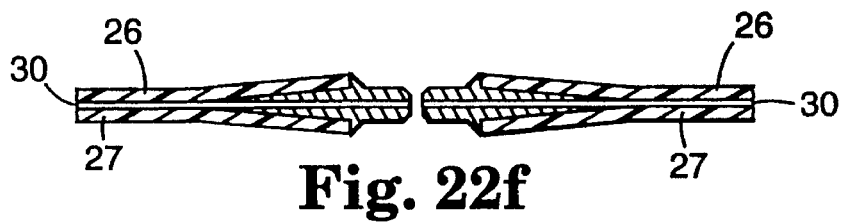

FIGS. 19 and 20 illustrate a first alternative embodiment of the present invention. A cable 518 of the first alternative embodiment illustrated in FIG. 19 is formed with a release element or elements 504 positioned only on the top of the fibers 30. The alternative embodiment of FIGS. 19 and 20 illustrate and will be described with reference to having a single release element positioned on the top portion of optical fibers 30. It should be noted that the release element, and the subsequent connector portions as will be described below, could instead be on the bottom of fibers 30 without departing from the spirit or scope of the invention. Cable 518 is cut along a center portion of one release element 504. Once cut, upper tape layer 26 with release element 504 attached is peeled back from optical fibers 30 exposing the top portion of the optical fibers. Optional lower tape layer 27 is still adhered to the bottom portion of optical fibers 30.

Connector 519 used in the first alternative embodiment is comprised of a top connector portion 520 and a bottom connector portion 522. Top connector portion 520 directly contacts optical fibers 30. In order to properly align the fibers, top connector portion 520 contains a series of grooves. Bottom connector portion 522 is a mechanical latching member that abuts lower adhesive tape layer 27. As illustrated in FIG. 19d, connecting portions 520, 522 are aligned with optical fibers 30 and then are mechanically latched together. Releasing element 504 is then removed from upper tape layer 26 and tape layer 26 is then secured to top connector portion 520. Finally, any excess tape is trimmed off.

FIG. 20 is an end view illustrating a series of optical fibers 30 in a ribbon cable 518 secured between top and bottom connector portions 520, 522 according to the first alternative embodiment of the present invention. As is illustrated in FIG. 20, connector portions 520, 522 include mating details 100, 102 to assist in the alignment and compression of connector portions 520, 522. It should be noted that connector portions could be secured together in numerous other ways such as with adhesives, mechanical latching mechanisms or welding, including ultrasonic welding.

FIG. 21 illustrates a second alternative embodiment of the present invention. Because the embodiment is very similar to the embodiment of FIG. 1, like elements will be correspondingly labeled. At least one optical fiber 30 is drawn from a corresponding spool 32 through a guiding comb 34. Comb 34 is provided to establish a fixed, lateral interfiber spacing between fibers 30. A strengthening member 530 is also drawn from a corresponding spool 532 for holding such strengthening members through guiding comb 34. Strengthening member 530 of the present invention is for providing tensile strength to the cable 28. The preferred strengthening member is Kevlar® but it may also be steel, liquid crystal polymer, high strength plastic, glass fiber or carbon fiber without departing from the spirit or scope of the invention.

As can be seen in FIG. 21, for a two fiber comb 34 strengthening member 530 occupies one of the fiber positions. Therefore, the cable created in FIG. 21 has only one light transmitting fiber. The present invention is equally applicable to multifiber cables having more than two fibers.

FIGS. 22a–f illustrate a series of side views of a third alternative embodiment of the present invention. This embodiment illustrates a method of field installing a pair of connectors onto a ribbon cable made according to the present invention. This embodiment is very much like the preferred embodiment except a pair of connectors are being installed on a ribbon cable as opposed to a single connector as in the preferred embodiment. Thus, like elements are correspondingly labeled.

After ribbon cable 28 has been formed according to the present invention, adhesive tape layers 26, 27, are cut perpendicular to the longitudinal axis at substantially the center of access point 502. While the tape layers are cut, optical fibers 30 are not cut at this time. Once cut, tape layers 26, 27 are peeled back to expose optical fibers 30. A dual, field installable connector 540 comprising a first connector portion 542 and a second connector portion 544 is then positioned about the exposed optical fibers 30. Connector portions 542, 544 are then permanently secured about optical fibers 30. Release elements 504, 506 are then removed from tape layers 26, 27 to expose fresh adhesive surfaces 514, 516 respectively. Tape layers 26, 27 are then pressed onto connector portions 542, 544 and any excess tape is then removed. Connector portions 542, 544 are then cut at center point 546, perpendicular to the longitudinal axis of fibers 30 to form two separate connector ends. A slight angle may be imparted onto the cut in order to aid in the prevention of reflections. The newly exposed ends of fibers 30 may or may not require additional polishing.

We claim:

1. A fiber optic ribbon cable comprising:
   a pair of adhesive tape layers, wherein each adhesive tape layer comprises an adhesive surface and has first and second ends;
   at least one optical fiber arranged in a generally longitudinal orientation between the pair of tape layers and in contact with the adhesive surfaces thereof; and
   at least one release element disposed between one of the adhesive tape layers and the at least one optical fiber to form a release location between the first and second ends.

2. The ribbon cable of claim 1 wherein the pair of adhesive tape layers includes an encapsulating layer and is the outermost jacket for the ribbon cable assembly.

3. The ribbon cable of claim 1 wherein each of the adhesive tape layers of the pair of adhesive tape layers is comprised of an outer protective member, an intermediate adhesive layer, and an inner encapsulating layer.

4. The ribbon cable of claim 3 wherein one layer of material comprises both the intermediate adhesive layer and the inner encapsulating layer.

5. The ribbon cable of claim 3 wherein the protective member is comprised of a material selected from the set of: plastic, metal, fabric or any combination thereof, the intermediate adhesive layer is comprised of a material selected from the set of: pressure sensitive adhesive, thermoset adhesive, thermoplastic adhesive, radiation-curable adhesive, mechanically interlocking structures or any combination thereof, and the inner encapsulating layer is comprised of a material selected from the set of: pressure sensitive adhesive, thermoset adhesive, thermoplastic adhesive, radiation-curable adhesive, gel, foam, fibrous material, deformable plastic or any combination thereof.

6. The ribbon cable of claim 3 wherein the release element is comprised of a coating applied to the inner encapsulating layer of at least one of the pair of adhesive tape layers to reduce the adhesion between the pair of adhesive tape layers and the at least one optical fiber.

7. The ribbon cable of claim 1 wherein the optical fibers each comprise a fiber optic core comprised of a material selected from the set of: glass, plastic or air, the fiber optic core being surrounded by an optical cladding layer comprised of a material selected from the set of: glass, plastic or metal.

8. The ribbon cable of claim 7 wherein the optical fibers further include a buffer layer surrounding the optical cladding layer, the buffer layer comprised of a material selected from the set of: plastic, metal, carbon, ceramic or any combination thereof.

9. The ribbon cable of claim 1 wherein a plurality of release elements are disposed at uniformly spaced locations along the longitudinal orientation of the cable assembly.

10. The ribbon cable of claim 1 wherein the adhesive tape layers have an indication means for indicating the location of the at least one release element.

11. The ribbon cable of claim 1 further comprising at least one tensile strength member arranged in a generally longitudinal orientation between the pair of tape layers.

12. The ribbon cable of claim 11 wherein the tensile strength member is comprised of a material selected from the set of: Kevlar®, steel, liquid crystal polymer, high strength plastic, glass fiber, and carbon fiber.

13. The ribbon cable of claim 1 wherein the at least one release element is comprised of a substrate layer and an adhesion inhibiting layer to reduce adhesion between the at least one release element and the pair of adhesive tape layers.

14. The ribbon cable of claim 13 wherein the substrate layer is comprised of a material selected from the set of: plastic, metal, fabric, and paper.

15. The ribbon cable of claim 13 wherein the adhesion inhibiting layer is comprised of a material selected from the set of: silicone, petroleum distillate, organic oil, plastic, low tack adhesive, wax, low surface-energy coating, and microstructured textured surface.

16. A fiber optic ribbon cable comprising:
   a pair of adhesive tape layers having first and second ends;
   a plurality of optical fibers arranged in a generally longitudinal orientation between the pair of tape layers with adjacent fibers positioned with an arbitrary lateral spacing relative to each other; and
   at least one release element disposed between the adhesive tape layers and the plurality of optical fibers to form a release location between the first and second ends.

17. The ribbon cable of claim 16 wherein the pair of adhesive tape layers includes at least one encapsulating layer and is the outermost jacket for the ribbon cable assembly.

18. The ribbon cable of claim 16 wherein each of the adhesive tape layers of the pair of adhesive tape layers is comprised of an outer protective member, an intermediate adhesive layer, and an inner encapsulating layer.

19. The ribbon cable of claim 18 wherein one layer of material comprises both the intermediate adhesive layer and the inner encapsulating layer.

20. The ribbon cable of claim 18 wherein the protective member is comprised of a material selected from the set of: plastic, metal, fabric or any combination thereof, the intermediate adhesive layer is comprised of a material selected from the set of: pressure sensitive adhesive, thermoset adhesive, thermoplastic adhesive, radiation-curable adhesive, mechanically interlocking structures or any combination thereof, and the inner encapsulating layer is comprised of a material selected from the set of: pressure sensitive adhesive, thermoset adhesive, thermoplastic adhesive, radiation-curable adhesive, gel, foam, fibrous material, deformable plastic or any combination thereof.

21. The ribbon cable of claim 18 wherein the at least one release element is comprised of a coating applied to the inner encapsulating layer of at least one of the pair of adhesive tape layers to reduce the adhesion between the pair of adhesive tape layers and the plurality of optical fibers.

22. The ribbon cable of claim 16 wherein the at least one release element is comprised of a substrate layer and an adhesion inhibiting layer to reduce adhesion between the at least one release element and the pair of adhesive tape layers.

23. The ribbon cable of claim 22 wherein the substrate layer is comprised of a material selected from the set of: plastic, metal, fabric, and paper.

24. The ribbon cable of claim 22 wherein the adhesion inhibiting layer is comprised of a material selected from the set of: silicone, petroleum distillate, organic oil, plastic, low tack adhesive, wax, low surface-energy coating, and microstructured textured surface.

25. The ribbon cable of claim 16 wherein the adhesive tape layers have an indication means for indicating the location of the at least one release element.

26. A method of manufacturing a fiber optic ribbon cable comprising the steps of:
  (a) providing a plurality of optical fibers oriented in a generally longitudinal orientation and having first and second ends;
  (b) applying at least one release element to the optical fibers between the first and second ends;
  (c) providing a pair of adhesive tape layers; and
  (d) sandwiching the at least one release element and optical fibers between the pair of adhesive tape layers to form a ribbon cable.

27. The method of claim 26 wherein step (a) is a continuous process of feeding the plurality of optical fibers from a corresponding plurality of spools of continuous optical fibers.

28. The method of claim 26 wherein step (d) is accomplished using at least a pair of rollers to compress the pair of adhesive tape layers together.

29. A method of manufacturing a fiber optic ribbon cable comprising the steps of:
  (a) providing at least one optical fiber oriented in a generally longitudinal direction and having first and second ends;
  (b) providing a first and second adhesive tape layer;
  (c) applying a release element to at least one of the first and second adhesive tape layers;
  (d) sandwiching the at least one optical fiber and the release element between the first and second adhesive tape layers to form a ribbon cable.

30. A method of applying a connector having first and second connector portions to a fiber optic ribbon cable containing a pair of adhesive tape layers, at least one optical fiber arranged in a generally longitudinal orientation between the pair of tape layers and a pair of release elements disposed between the adhesive tape layers and the at least one optical fiber, the method comprising the steps of:
  (a) locating the release elements on the fiber optic ribbon cable;
  (b) cutting the ribbon cable substantially perpendicular to its longitudinal axis near the midpoint of the release elements;
  (c) peeling back the adhesive tape layers and release elements to expose the at least one optical fiber;
  (d) aligning the first connector portion with the at least one exposed fiber;
  (e) aligning the second connector portion with the at least one exposed fiber and with the first connector portion;
  (f) fastening the first and second connector portions about the at least one exposed fiber;
  (g) removing a release element from the adhesive tape layers; and
  (h) applying the tape layers to the first and second connector portions.

31. The method of claim 30 further including the step of trimming away any excess adhesive tape.

32. A method of applying a connector having first and second connector portions to a fiber optic ribbon cable containing first and second adhesive tape layers, at least one optical fiber arranged in a generally longitudinal orientation between the first and second tape layers and a release element disposed between the first tape layer and the at least one optical fiber, the method comprising the steps of:
  (a) locating the release element on the fiber optic ribbon cable;
  (b) cutting the ribbon cable substantially perpendicular to its longitudinal axis near the midpoint of the release element;
  (c) peeling back the first adhesive tape layer and release element to expose a portion of the at least one optical fiber;
  (d) aligning the first connector portion with the exposed portion of the at least one optical fiber;
  (e) aligning the second connector portion with the first connector portion;
  (f) fastening the first and second connector portions about the at least one exposed fiber and the second adhesive tape layer;
  (g) removing the release element from the first adhesive tape layer; and
  (h) applying the first tape layer to the first connector portion.

33. The method of claim 32 further including the step of trimming away any excess adhesive tape.

34. A method of applying a connector having first and second connector portions to a fiber optic ribbon cable containing a pair of adhesive tape layers, at least one optical fiber arranged in a generally longitudinal orientation between the pair of tape layers and a pair of release elements disposed between the adhesive tape layers and the at least one optical fiber, the method comprising the steps of:
  (a) locating the release elements on the fiber optic ribbon cable;
  (b) cutting the adhesive tape layers and release elements substantially perpendicular to the longitudinal axis near a midpoint of the release elements;
  (c) peeling back the adhesive tape layers and release elements to expose the at least one optical fiber;
  (d) aligning the first connector portion with the at least one exposed fiber;
  (e) aligning the second connector portion with the at least one exposed fiber and with the first connector portion;
  (f) fastening the first and second connector portions about the at least one exposed fiber;
  (g) removing the release elements from the adhesive tape layers;
  (h) applying the tape layers to the first and second connector portions;
  (i) cutting away unwanted portions of the adhesive tape layers; and
  (j) cutting the two connector portions and at least one encapsulated fiber near a midpoint of the two connector portions substantially perpendicular to the longitudinal axis to form two separate connectorized cable assembly ends.

* * * * *